United States Patent [19]

Tanaka

[11] Patent Number: 4,496,019
[45] Date of Patent: Jan. 29, 1985

[54] OFFROAD AUTO TRICYCLE

[75] Inventor: Ko Tanaka, Shizuoka, Japan

[73] Assignee: Yamaha Hatsudoki Kabushiki Kaisha, Japan

[21] Appl. No.: 389,954

[22] Filed: Jun. 18, 1982

[30] Foreign Application Priority Data

Jun. 22, 1981 [JP] Japan ................................. 56-96150

[51] Int. Cl.³ ................................................ B62K 5/04
[52] U.S. Cl. .................................... 180/215; 180/225
[58] Field of Search ...................... 180/215, 225, 54 A

[56] References Cited

U.S. PATENT DOCUMENTS 4,325,562 4/1982 Yamada et al. ..................... 180/215
4,354,570 10/1982 Tanaka et al. ...................... 180/225

FOREIGN PATENT DOCUMENTS

| 25165 | 10/1955 | Fed. Rep. of Germany | 180/225 |
| 1093245 | 11/1960 | Fed. Rep. of Germany | 180/225 |
| 89633 | 12/1958 | Netherlands | 180/225 |
| 631946 | 11/1949 | United Kingdom | 180/225 |

Primary Examiner—Joseph F. Peters, Jr.
Assistant Examiner—Ross Weaver
Attorney, Agent, or Firm—Ernest A. Beutler

[57] ABSTRACT

An offroad auto tricycle embodying an improved air inlet to prevent the ingestion of foreign material and particularly water into the engine induction system. The air inlet device includes an elongated air inlet tube that has its inlet end positioned in proximity to and beneath the forwardmost portion of the seat for protecting the air inlet from foreign matter.

7 Claims, 2 Drawing Figures

OFFROAD AUTO TRICYCLE

BACKGROUND OF THE INVENTION

This invention relates to an offroad auto tricycle and more particularly to an improved air intake system for the engine of such a vehicle.

As is well known, offroad three wheel vehicles operate over a wide variety of terrain, both wet and dry. In fact, in many occasions, the vehicle may operate in water when it is operated on a coastline. Because of the driving arrangement of the driven rear wheels of such vehicles and the rearward location of the center of gravity, quite often the rear wheels operate at a much lower level in the terrain than do the front wheels. In fact, it is not uncommon for the front wheel to float on the surface of the water when it is driven through shallow water.

The driving engine for three wheel vehicles is also located to the rear of the vehicle and close to the rear wheels. As a result, its air intake and air cleaner is disposed closely adjacent the rear wheels with conventional three wheel vehicles. As a result, the air cleaner is positioned in an area where foreign objects and water will be thrown onto it by the rear wheels with conventional arrangements. Also, if operated in deeper water, it is possible for the air cleaner to become submerged which gives rise to obvious difficulties.

It is, therefore, a principle object of this invention to provide an improved air intake system for the engine of an offroad vehicle.

It is another object of the invention to provide an air intake system for an offroad vehicle wherein the intake is positioned in a protected area.

SUMMARY OF THE INVENTION

This invention is adapted to be embodied in an induction system for an off the road vehicle having a pair of driven rear wheels and at least one dirigible front wheel. An engine is position contiguous to the rear wheels and drives them. A seat extends forwardly from the rear wheels and an air cleaner is provided in proximity to the engine. In accordance with the invention, an inlet device is provided for supplying air to the air cleaner from a protected area contiguous to the front of the seat.

DETAILED DESCRIPTION OF THE PREFERRED EMBODIMENT

Figure 1:
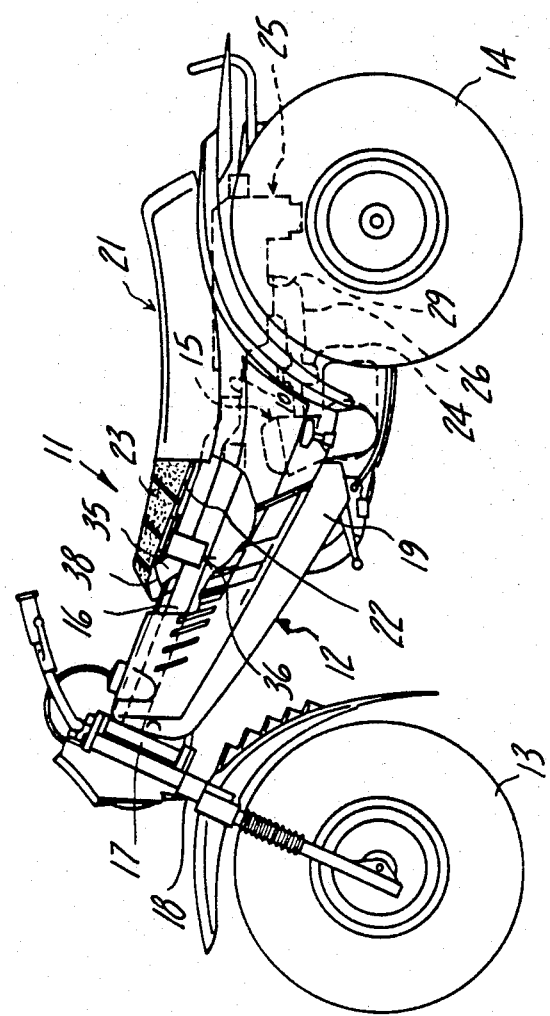
FIG. 1 is a side elevational view of a three wheel off the road vehicle constructed in accordance with the invention, with a portion broken away.

In the drawings, the reference numeral 11 indicates generally an off the road three wheel vehicle constructed in accordance with the invention. The vehicle 11 includes a body and frame assembly, indicated generally by the reference numeral 12, which supports a single steerable front wheel 13 and a pair of driven rear wheels 14. A motor and transmission assembly 15 is provided for powering the rear wheels 14 in a known manner.

The body and frame assembly 12 includes a main tube 16 that carries a head pipe 17 at its forward end. The head pipe 17 journals a front fork 18 for steering movement. The front fork 18 rotatably supports the front wheel 13.

Figure 2:
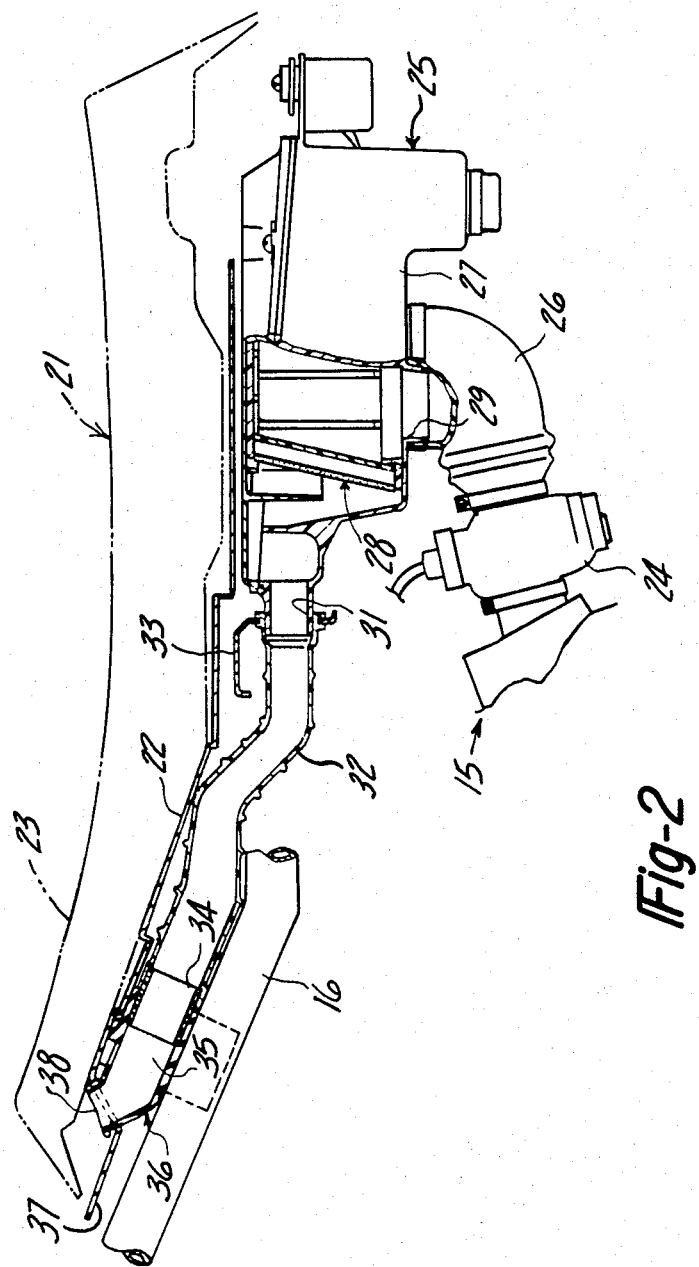
FIG. 2 is an enlarged side elevational view of the inlet system of the vehicle shown in FIG. 1 with portions shown in phantom and other portions broken away.

Side covers 19 cover the sides of the frame assembly and protect at least partially the running components. A seat, indicated generally by the reference numeral 21 is supported on the main pipe 16. The seat 21, as best seen in FIG. 2, includes a base plate 22 and a supported cushion 23. The seat 21 extends from a point in proximity to the rear wheels for a substantial length of the frame and specifically of the main tube 16. The forward portion of the seat 21 extends upwardly at an angle as does the main tube 16.

As has been noted, the engine 15 is positioned in close proximity to the driven rear wheels 14. The engine includes a carburetor 24 that supplies a fuel/air mixture to the engine 15 in a known manner. The carburetor 24 is disposed immediately adjacent the forward portion of the rear wheels 14 and receives air from an air cleaner, indicated generally by the reference numeral 25, through a flexible connecting tube 26.

The air cleaner 25 is disposed immediately beneath the rear portion of the seat 21 and between the rear wheels 14. The air cleaner 25 is comprised of an outer housing 27 in which a filter element 28 is supported in a known manner. The outer housing 27 includes a lower tray having an air outlet opening 29 that cooperates with the flexible pipe 26 for delivery of filtered air to the carburetor 24 and engine 15. An air inlet 31 is formed in the outer housing 27 extending toward the front of the vehicle. With conventional constructions, the air cleaner inlet 31 is disposed in proximity to the rear wheels 14 and thus is in a position to ingest foreign matter, particularly water which may be thrown upwardly from the rear wheels 14. In addition, due to the rearward placement of the center of gravity and the overall construction of the three wheel vehicle 11, when operating even in shallow water, the rear wheels 14 will tend to sink while the front wheel 13 will tend to rise. Thus, with conventional constructions, it might very well be possible for the air cleaner inlet 31 in coventional constructions to be submerged in operation in even shallow water.

In accordance with this invention, an inlet is provided for delivering air to the air cleaner inlet 31 from such a location that the likelihood of ingestion of water or other foreign material, even when operating in water, will be substantially precluded. This air cleaner inlet device comprises a duct tube 32 that is affixed at its outlet end around the air cleaner inlet 31. This portion of the duct tube 32 and air cleaner inlet 31 is supported by a bracket 33 which is affixed in any suitable manner to the vehicle and frame assembly 12. The duct tube 32 extends forwardly and upwardly along the body and at its forwardmost end lies on top of the main tube 16 in proximity to the forward portion of the seat 21 and beneath the plate 22.

The forward end of the duct tube 32 encircles and is connected to a short connecting member 34 of cylindrical shape. The connecting member 34 is, in turn, fitted into a cylindrical portion 35 of a combined inlet and supporting member, indicated generally by the reference numeral 36. The inlet and supporting member 36 is affixed in a suitable manner to the main tube 16 and extends between it and the forwardmost portion of the seat plate 22. The forwardmost portion of the seat plate 22 has an offset part 37 through which an inlet opening 38 of the member 36 extends. Thus, inlet air is delivered to the member 38 from a protected area between the seat plate portion 37 and the seat cushion 23.

The inlet member 36 is formed from a resilient material such as rubber and thus will absorb vibrations. In addition, the connecting duct 32 may also be resilient so as to accommodate vibrations as may occur during operation of the vehicle.

It should be readily apparent that the location of the inlet opening 38 for the air system of the engine 15 is closely adjacent the front wheel 13 and is in a protected environment between the seat cushion 21 and the offset portion 37 of the seat plate 22. Thus, even if the rear wheels 14 are fully submerged and the main air cleaner 25 is fully submerged, the inlet 38 will be positioned above the water level so as to insure against the ingestion of water into the induction system. Also, the protected inlet 38 is positioned sufficiently far from the wheels 14 and in a protected environment so that any water or foreign matter thrown upwardly by the rear wheels 14 cannot enter the inlet 38. Even if the front wheel 13 is submerged, the running of the vehicle 11 will cause the front wheel to lift due to the center of gravity and the buoyant nature of the front wheel 13 so that the inlet opening 38 will always be positioned above the water level.

It is to be understood that the foregoing description is that of a preferred embodiment of the invention and that various changes and modifications may be made without departing from the spirit and scope of the invention, as defined by the appended claims.

I claim:

1. In an induction system for an off the road vehicle having a pair of driven rear wheels and at least one dirigible front wheel, an engine positioned continuous to said rear wheels and having a rearwardly facing induction system inlet, a seat extending forwardly from said rear wheels, and an air cleaner positioned in proximity to and to the rear of said engine and said induction system inlet and contiguous to said rear wheels, the improvement comprising an inlet device comprising an elongated tube means terminating at an outlet end rearwardly of the engine and communicating with a forwardly facing inlet of said air cleaner for supplying air to said air cleaner from an inlet end forwardly of the engine and disposed in a protected area contiguous to the front of said vehicle, said inlet end being disposed so that foreign materials will be precluded from entry thereto, an outlet from said air cleaner, and conduit means connecting said air cleaner outlet with said induction system inlet.

2. In an induction system as set forth in claim 1 wherein the inlet device inlet end terminates beneath the forwardmost portion of the seat.

3. In an induction system as set forth in claim 1 wherein the inlet device comprises an elongated flexible tubing.

4. In an induction system as set forth in claim 3 wherein the inlet device inlet end is positioned beneath the forwardmost portion of the seat.

5. In an induction system as set forth in claim 4 wherein the inlet device inlet end faces the underside of the forwardmost portion of the seat.

6. In an induction system for an off the road vehicle having a pair of driven rear wheels and at least one dirigible front wheel, an engine positioned contiguous to said rear wheels, a seat extending forwardly from said rear wheels, and an air cleaner positioned in proximity to said engine and contiugous to said rear wheels, the improvement comprising an inlet device comprising an elongated flexible tube means terminating at its outlet end in said air cleaner for supplying air to said air cleaner from an inlet end disposed in a protected area contiguous to the front of said vehicle, said inlet end being disposed so that foreign materials will be precluded from entry thereto, said seat comprising a cushion portion and a base plate portion, the forwardmost portion of said base plate portion being spaced from said cushion portion to define a space with said inlet device inlet end being in communication with said space and being positioned therein and facing the underside of the forwardmost portion of said seat.

7. An induction system for an off the road vehicle as set forth in claim 1 wherein the forwardly facing inlet of the air cleaner is formed in a forward face of the air cleaner.

* * * * *